Aug. 21, 1934.　　　R. G. ALLEN　　　1,970,792
GLASSWARE FORMING MACHINE
Filed Sept. 19, 1932　　　4 Sheets-Sheet 2
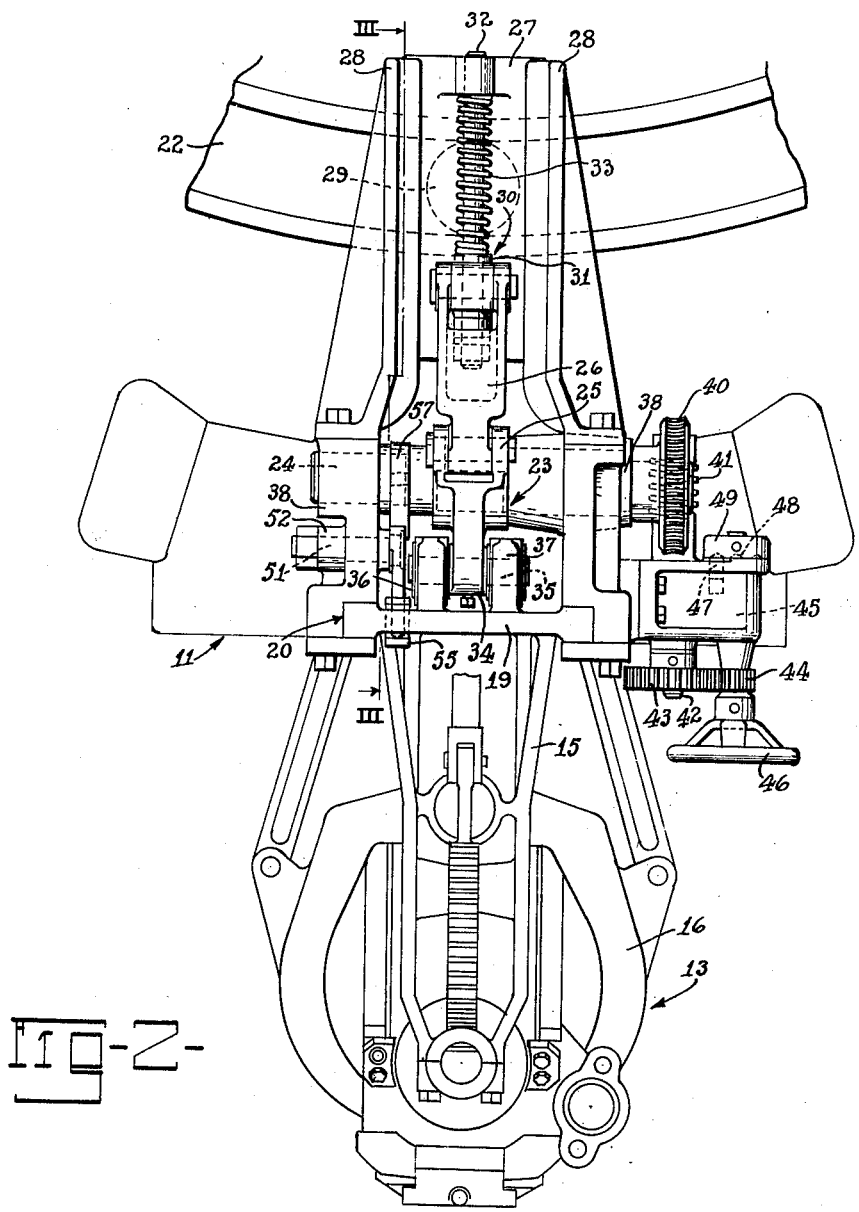

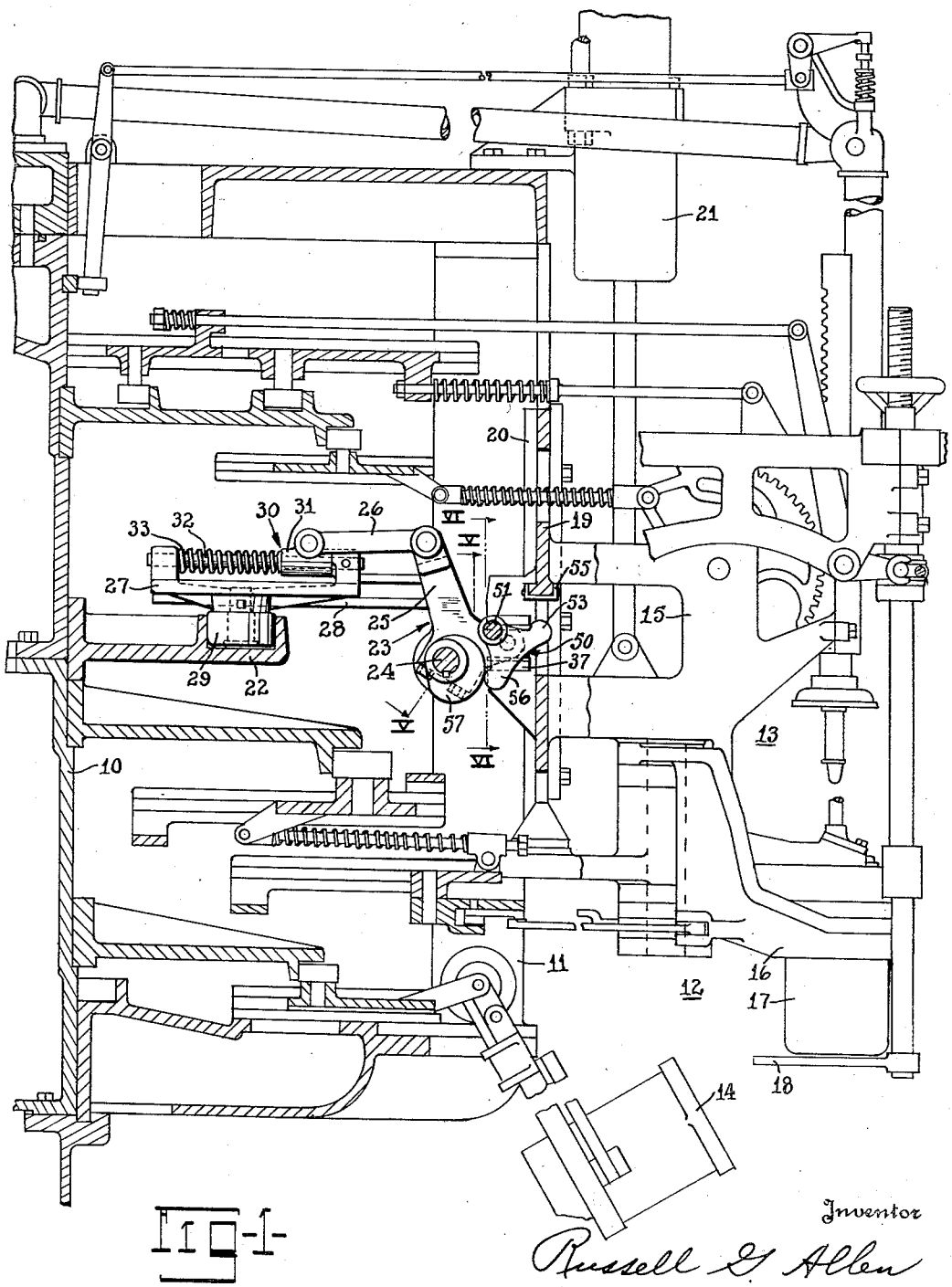

Aug. 21, 1934.  R. G. ALLEN  1,970,792
GLASSWARE FORMING MACHINE
Filed Sept. 19, 1932  4 Sheets-Sheet 3
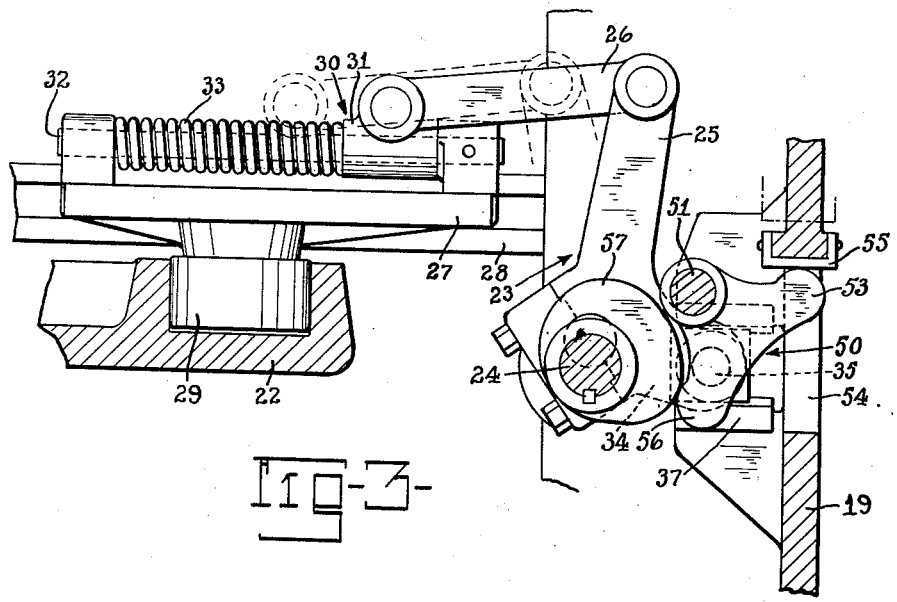
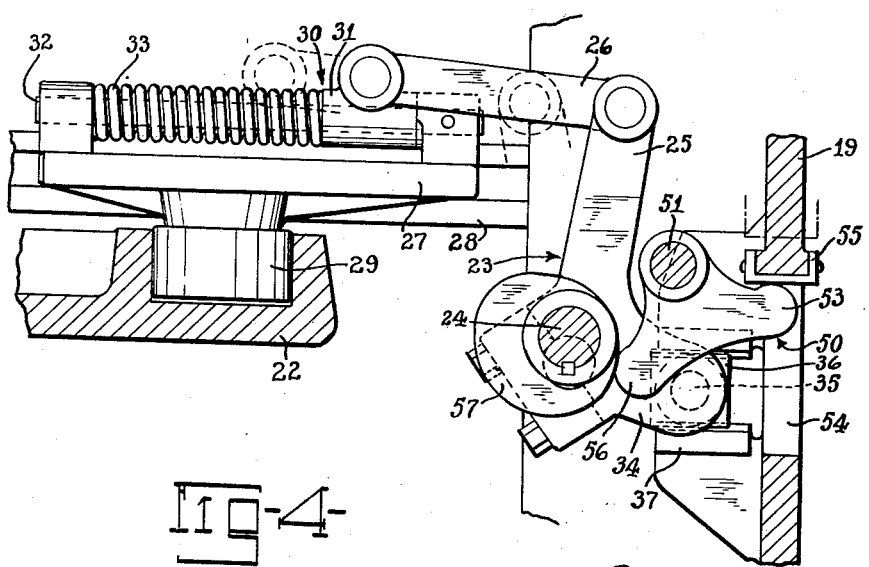
Inventor
Russell G. Allen
By J. F. Rule
Attorney

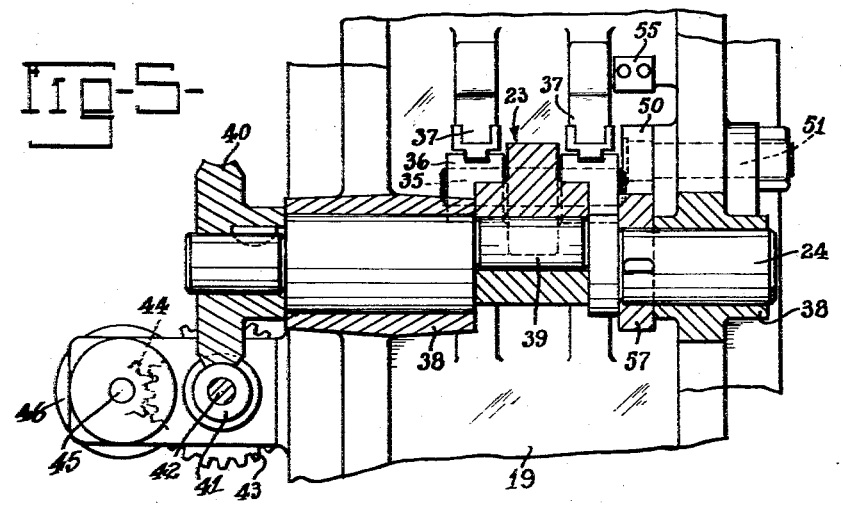
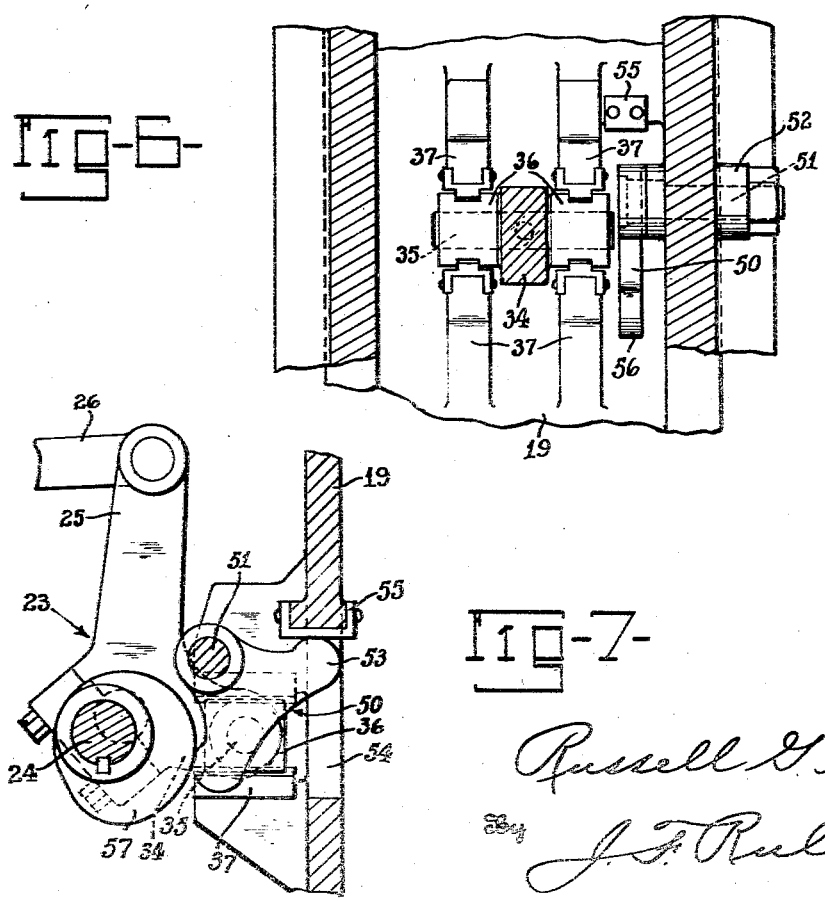

Patented Aug. 21, 1934

1,970,792

UNITED STATES PATENT OFFICE 1,970,792

GLASSWARE FORMING MACHINE

Russell G. Allen, Alton, Ill., assignor to Owens-Illinois Glass Company, a corporation of Ohio Application September 19, 1932, Serial No. 633,866

13 Claims. (Cl. 49—5)

The present invention relates to improvements in glassware forming machines and more particularly to that type in which suction type blank molds are periodically brought into charge gathering contact with an exposed area of a supply body of molten glass.

Machines of the character with which the present invention is especially adapted for use, ordinarily comprise a series of mold groups mounted upon a rotary mold carriage which is rotated continuously so that the mold groups are brought in succession to a mold charging zone or position. Each mold group includes a suction type blank mold, which is moved vertically at the charging position for the purpose of alternately making and breaking sealing contact between the bottom of the mold and the surface of the supply body of glass. Each blank mold forms part of a unit consisting of a dipping frame slidingly supported on the mold carriage and adapted to be reciprocated vertically a predetermined distance while over a supply body of molten glass, the extent of reciprocation corresponding to the difference between the elevations at which the mold charging and charge severing operations are effected. It will be understood that during the usual gathering operation, the molds may and usually do actually project a short distance into the glass, while in the cut-off position they are spaced a short distance above the surface of the glass. In LaFrance Patent 1,185,687, granted June 6, 1916, there is illustrated a machine of the type referred to above and generally shown in the present application.

An object of the present invention is the provision of improved raising and lowering mechanism for the blank molds, facilitating adjustment of the blank mold carriers to compensate for variations in the lengths of the blank molds.

Another object is the provision of a stop operating to limit downward movement of each blank mold, and means whereby the operating position of the stop is automatically changed simultaneously with and by adjustment of the raising and lowering mechanism.

A further object is the provision of blank mold raising and lowering mechanism in which the number of operating parts and, therefore, lost motion and wear is greatly reduced as compared with other mechanisms having a like function.

Other objects will be in part apparent and in part pointed out hereinafter.

In the drawings:

Fig. 1 is a side elevational view with parts in section, showing the invention embodied in a mold group or head of a conventional Owens type machine.

Fig. 2 is a top plan view thereof.

Fig. 3 is a fragmentary detail view taken along the line III—III of Fig. 2, showing the raising and lowering mechanism adjusted to support the mold carrier or dipping frame in a position to accommodate blank molds of maximum length.

Fig. 4 is a view similar to Fig. 3 showing the mechanism adjusted to accommodate short molds.

Fig. 5 is a vertical sectional view with parts in elevation, taken substantially along the line V—V of Fig. 1.

Fig. 6 is a sectional elevational view taken along the line VI—VI of Fig. 1.

Fig. 7 is a detail sectional elevational view showing one adjusted position of the raising and lowering mechanism.

The machine with which the present invention is illustrated is of the well known Owens type, generally shown in the LaFrance patent referred to above and includes a stationary central column 10 supporting a rotary mold carriage 11 on which mold groups 12 or heads, are mounted. Each mold group may consist of a blank mold unit 13 and a finishing mold unit 14, both of which may well be of conventional form. In more or less general terms the blank mold unit includes a dipping frame 15, a blank mold carrier 16 at its lower end, and a suction type blank mold 17 supported on the carrier. A cut-off knife 18 is mounted upon the dipping frame in proximity to the mold and operates periodically in the usual manner for severing gathered mold charges from a supply body of glass (not shown). The dipping frame 15 is mounted for up and down movement on the mold carriage so that the lower end of the blank mold 17 may be moved into and out of contact with the supply body of glass. The dipping frame 15 includes a vertical slide 19 at its inner end mounted in slideways 20 formed on the mold carriage 11. Normally the dipping frame 15 is yieldingly held in its uppermost position by a spring counter-balancing device 21, the construction and operation of which will be understood by reference to Rohrich Patent 1,821,077, dated September 1, 1931.

The mechanism for imparting vertical movement to the dipping frame is operated by a stationary dipping cam 22 which is mounted upon the central column 10 and is common to the raising and lowering mechanisms associated with the several mold groups. This mechanism includes a bell crank lever 23 which is journaled on a horizontal rod 24 and has one arm 25 connected through a link 26 to a slide 27. This slide is mounted in radial slideways 28 on the mold carriage and carries a cam roll 29 on its lower side running in the dip cam 22. The link 26 and slide 27 are secured together by a yielding connector 30 which may include a sleeve 31 sliding upon a rod 32, and a coil spring 33 tending to hold the sleeve at one end of the rod. Such construction provides a safety feature whereby breaking or undue straining of parts of the mechanism may be avoided. The other arm 34 of the bell crank lever 23 is connected through a transverse pin 35 to a pair of slide blocks 36 which are mounted in pairs of horizontal slideways 37, the latter provided on the inner end of the dipping frame 15. Rocking of the bell crank lever which is effected by the cam 22, imparts vertical movement to the dipping frame and thereby alternately raises and lowers the blank mold as it travels through the charging zone.

From time to time it is necessary to change the molds of a glassware forming machine for the purpose of producing various types and sizes of articles. This generally involves the use of blank molds of different lengths and necessitates vertical adjustment of the dipping frame in order to insure proper relation between the charging ends of the blank molds and the supply body of glass during the charging operation. The extent of up and down movement of the mold does not vary, but as just indicated, it is necessary to change the elevations to which the mold is raised and lowered. The construction whereby such adjustment may be obtained in order to compensate for variations in the length of the molds includes means whereby the pivot of the bell crank lever 23 may be adjusted vertically. For this purpose the rod 24 which supports the lever 23 and is journaled in a pair of horizontal bearings 38, is formed to include an offset central portion 39 upon which the lever 23 is journaled. By imparting rotary movement to this rod the elevation of this off-set portion 39 is changed with the result that the lever and corresponding dipping frame will be moved vertically with respect to the mold carriage 10. Such adjustment of the rod 24 is obtained by mechanism including a worm gear 40 secured to one end of the rod and meshing with a worm 41 at the inner end of a shaft 42 which at its outer end carries a gear 43 meshing with a pinion 44, said pinion mounted upon a shaft 45 extending inwardly from a hand wheel 46. Rotation of the hand wheel imparts rotary motion to the rod 24 by way of said gears. A spring detent 47 cooperates with recesses 48 in a collar 49 at the inner end of the shaft 45 in securing the adjusting mechanism against premature or accidental operation.

A stop 50 cooperates with the raising and lowering mechanism in determining the lowermost position of the dipping frame and insures against too great projection of the blank mold into the supply body of glass. This stop is adjusted as to its operating position by rotation of the rod 24 upon which the bell crank lever 23 is supported. The stop 50 consists of a triangular plate suspended at one corner from a horizontal pin 51, said pin being suitably supported in a bearing 52 on the mold carriage 11. The forward or outer end 53 of this stop extends into a horizontal opening 54 in the slide 19 where it is adapted for engagement with a hardened plate 55 when the dipping frame is in its lowermost position. The other or inner end 56 constantly engages a cam 57 which is mounted upon the rod 24. This cam is of such shape and so positioned on the rod that with rotation of the latter for the purpose of changing the elevation of the bell crank pivot, said cam is moved to change the elevation of the outer end 53 of the stop.

In view of the above, it is evident that variations in the length of blank molds used on the forming machine may be compensated for by changing the elevation of the dipping frame 15, such change being effected by manual rotation of the hand wheel 46 through which the offset portion 39 of the rod 24 is raised and lowered. Such adjustment of the offset portion effects the necessary changes in the elevation of the dipping frame. The adjustable stop 50, as brought out heretofore, is moved about its supporting pin 51 by means of the cam 57 simultaneously with adjustment of said offset portion 39 with the result that the dipping frame cannot move downwardly beyond a point at which the lower end of the blank mold is brought into sealing contact with the supply body of molten glass.

Modifications may be resorted to within the spirit and scope of the appended claims.

What I claim is:

1. In a glassware forming machine, a main frame, a dipping frame mounted for up and down movement on the main frame, a blank forming unit on the dipping frame including a suction blank mold, means for raising and lowering the dipping frame including a bell crank lever pivoted for swinging movement about a horizontal axis, manually operated means for changing the elevation of the pivot about which the lever swings to thereby regulably control the elevations to which said dipping frame is raised and lowered, a stop cooperating with the raising and lowering means for limiting downward movement of the dipping frame, and means whereby the operating position of the stop is automatically adjusted by changing the elevation of the pivot about which said lever swings.

2. In a glassware forming machine, a main frame, a dipping frame mounted for up and down movement on the main frame, a blank forming unit on the dipping frame including a suction blank mold, means for raising and lowering the dipping frame including a bell crank lever pivoted for swinging movement about a horizontal axis, manually operated means for changing the elevation of the pivot about which the lever swings to thereby regulably control the elevations to which said dipping frame is raised and lowered, a pivoted stop cooperating with the raising and lowering means for determining the lowermost position of the dipping frame, and means operated automatically by adjustment of the pivot about which the lever swings for adjusting the stop about its pivot.

3. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, means providing operating connection between the lever and dipping frame, means for rocking said lever, and manually controlled means for imparting rotary motion to the rod to thereby change the elevation of said offset portion and vertically adjust the path of vertical movement of the dipping frame.

4. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, means providing horizontal sliding connection between the lever and dipping frame, means for rocking said lever, and manually controlled means for imparting rotary motion to said rod to thereby change the elevation of said offset portion.

5. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, means providing operating connection between the lever and dipping frame, means for rocking said lever, manually controlled means for imparting rotary motion to the rod to thereby change the elevation of said offset portion and vertically adjust the path of vertical movement of the dipping frame, and a stop cooperating with the raising and lowering mechanism for limiting downward movement of the dipping frame.

6. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, means providing operating connection between the lever and dipping frame, means for rocking said lever, manually controlled means for imparting rotary motion to the rod to thereby change the elevation of said offset portion and vertically adjust the path of vertical movement of the dipping frame, a stop cooperating with the raising and lowering mechanism for limiting downward movement of the dipping frame, and means whereby adjustment of the offset portion correspondingly changes the operating position of said stop.

7. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, a horizontally disposed slide connected to the lower end of the bell crank lever, slideways on the dipping frame in which said slide moves, means for rocking said lever, and manually controlled means for imparting rotary motion to the rod to thereby change the elevation of said offset portion.

8. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, a horizontally disposed slide connected to the lower end of the bell crank lever, slideways on the dipping frame in which said slide moves, means for rocking said lever, manually controlled means for imparting rotary motion to the rod to thereby change the elevation of said offset portion, a pivoted stop carried by the main frame and cooperating with said raising and lowering mechanism in limiting downward movement of the dipping frame, and means whereby adjustment of said offset portion correspondingly changes the operating position of the stop.

9. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, a horizontally disposed slide connected to the lower end of the bell crank lever, slideways on the dipping frame in which said slide moves, means for rocking said lever, manually controlled means for imparting rotary motion to the rod to thereby change the elevation of said offset portion, a pivoted stop carried by the main frame and cooperating with said raising and lowering mechanism in limiting downward movement of the dipping frame, and a cam moved by adjusting of said offset portion and operating to change the operating position of said stop.

10. In combination, a main frame, a dipping frame mounted for up and down movement on the main frame, a blank mold on the dipping frame, mechanism for raising and lowering said dipping frame comprising a horizontal rod having an offset portion, a bell crank lever journaled on said portion, a horizontally disposed slide connected to the lower end of the bell crank lever, slideways on the dipping frame in which said slide moves, means for rocking said lever, manually controlled means for imparting rotary motion to the rod to thereby change the elevation of said offset portion, a pivoted stop carried by the main frame and cooperating with said raising and lowering mechanism in limiting downward movement of the dipping frame, and a cam on said rod constantly engaging the stop and operating with rotation of the rod to change the position of the stop.

11. A glassware forming machine comprising a mold carriage mounted for rotation about a vertical axis, a mold group on said carriage including a dipping frame mounted for up and down movement on the mold carriage, a suction blank mold on said frame, a finishing mold mounted upon the carriage in a plane beneath the blank mold, mechanism for raising and lowering the dipping frame and mold, said mechanism including a horizontal rod mounted upon the mold carriage and having an offset portion, a bell crank lever mounted for oscillation upon said portion, means providing connection between the lever and dipping frame, means for rocking the lever, and manually controlled means for imparting rotary movement to the rod about its axis to thereby change the elevation of the offset portion.

12. A glassware forming machine comprising a mold carriage mounted for rotation about a vertical axis, a mold group on said carriage including a dipping frame mounted for up and down movement on the mold carriage, a suction blank mold on said frame, a finishing mold mounted upon the carriage in a plane beneath the blank mold, mechanism for raising and lowering the dipping frame and blank mold, said mechanism including a bell crank lever mounted upon the mold carriage for oscillation about a horizontal pivot, means providing operative connection between the lever and dipping frame, means for rocking the lever at regular time intervals, manually controlled means for changing the elevation of the pivot about which the lever rocks, a stop mounted on the carriage for cooperation with the raising and lowering mechanism in limiting downward movement of the dipping frame, and means whereby adjustment of the elevation of said pivot correspondingly changes the setting of said stop.

13. A glassware forming machine comprising a mold carriage mounted for rotation about a vertical axis, a mold group on said carriage including a dipping frame mounted for up and down movement on the mold carriage, a suction blank mold on said frame, a finishing mold mounted upon the carriage in a plane beneath the blank mold, mechanism for raising and lowering the dipping frame and mold, said mechanism including a horizontal rod mounted upon the mold carriage and having an offset portion, a bell crank lever mounted for oscillation upon said portion, means providing connection between the lever and dipping frame, means for rocking the lever, manually controlled means for imparting rotary movement to the rod about its axis to thereby change the elevation of the offset portion, a pivoted stop mounted on the mold carriage for cooperation with the raising and lowering mechanism in limiting downward movement of the dipping frame, and a cam on the rod rotatable therewith and adapted to move the stop about its pivot during adjustment of the offset portion.

RUSSELL G. ALLEN.